UNITED STATES PATENT OFFICE 2,287,523

PROCESS FOR PREPARING FORMYL DIAMINES

Alva L. Houk, Philadelphia, Pa., assignor to Röhm & Haas Company, Philadelphia, Pa.

No Drawing. Application November 8, 1940, Serial No. 364,843

5 Claims. (Cl. 260—584)

This invention relates to compounds of the formula

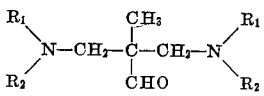

wherein $R_1$ and $R_2$ are aliphatic hydrocarbon groups. This invention also concerns a process for preparing these compounds, wherein methacrolein is reacted with a N,N,N',N'-aliphatically substituted methylene diamine.

The N,N,N',N'-aliphatically substituted methylene diamine may be prepared by the reaction of aliphatic secondary amines with formaldehyde or a polymer thereof. As an aliphatic secondary amine there may be used dimethylamine, diethylamine, diisobutylamine, diallylamine, methylcaprylamine, methyldodecylamine, or the like. The resulting ditertiary methylene diamine has the structure

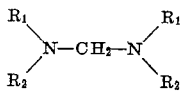

A diamine of this formula and methacrolein are mixed and heated at reacting temperatures, preferably in the presence of a small amount of water as a catalyst. The temperature of reaction may be between about 70° C. and about 150° C. The reaction is most conveniently carried out by heating the reacting mixture on a water bath or, if an organic solvent be used, by heating under reflux. The reaction may also be carried out under pressure.

The following examples illustrate the preparation of the formyl diamines.

Example 1

A mixture of 70 parts of methacrolein, 105 parts of tetramethyl methylene diamine and 6 parts of water was stirred for five hours on a water bath held at 90° C. The reaction mixture was then subjected to distillation under reduced pressure and 118 parts of a product boiling between 90° and 100° C. at 28 mm. was collected. This product is a colorless liquid which is insoluble in water but soluble in dilute acids. It slowly reduces ammoniacal silver nitrate. After redistillation at 90–96° C. at 22 mm. the product has an equivalent weight of 87.8, corresponding fairly closely with that for

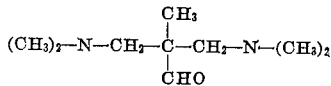

Example 2

A mixture of 70 parts of methacrolein, 120 parts of tetramethyl methylene diamine, and 9 parts of water was stirred on a steam bath for one and one-half hours and left standing overnight. The reaction mixture was then subjected to distillation under reduced pressure and a fraction of 123 parts collected which boiled between 102° and 114° C. at 32 mm. The equivalent weight of this rather wide cut, 88.5, indicates that it is the same product as was obtained in Example 1.

Example 3

A mixture of 120 parts of tetraethyl methylene diamine, 52.5 parts of methacrolein, and 6.75 parts of water was stirred for one and one-half hours on a water bath at 90° C. After the reacted mixture had stood for three hours, the water layer which had separated was removed and the organic layer distilled under reduced pressure. There was obtained 77 parts of a liquid boiling at 147° C. at 26 mm. This liquid has an equivalent weight of 117 and corresponds to

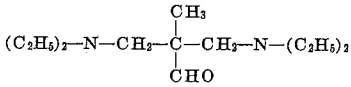

Compounds of the above type are useful in the textile field, reacting with cellulose under heat to modify the surface thereof. They are also useful intermediates for the preparation of quaternary ammonium derivatives, which are particularly useful as textile assistants and for the modification of cellulosic fibers, yarns, and fabrics. By the reaction of cellulosic materials with the formyl diamines of this invention the swelling properties and also the dyeing properties thereof are altered. The treated cellulosic material may thus be rendered resistant to water.

I claim:

1. The process of preparing N,N,N',N'-aliphatically substituted formyl diamines which comprises reacting by heating between about 70° C. and about 150° C. in the presence of a small amount of water methacrolein and a compound of the formula

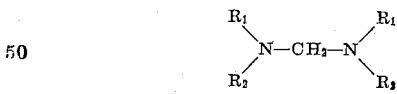

wherein $R_1$ and $R_2$ are aliphatic hydrocarbon groups.

2. The process of preparing N,N,N',N'-aliphatically substituted formyl diamines which comprises heating between about 70° C. and about 150° C. a mixture containing methacrolein, a small amount of water, and a compound of the formula

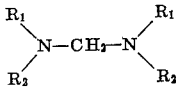

wherein $R_1$ and $R_2$ are aliphatic hydrocarbon groups.

3. The process of preparing N,N,N',N'-aliphatically substituted formyl diamines which comprises heating at reflux temperature a mixture of methacrolein, a small amount of water, and a compound of the formula

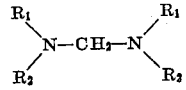

wherein $R_1$ and $R_2$ are aliphatic hydrocarbon groups.

4. The process of preparing N,N,N',N'-tetramethyl substituted formyl diamines which comprises heating between about 70° C. and about 150° C. a mixture of methacrolein, a small amount of water, and N,N,N',N'-tetramethyl methylene diamine.

5. The process of preparing N,N,N',N'-tetraethyl substituted formyl diamines which comprises heating between about 70° C. and about 150° C. a mixture of methacrolein, a small amount of water, and N,N,N',N'-tetraethyl methylene diamine.

ALVA L. HOUK.